(12) United States Patent
Nishiyama et al.

(10) Patent No.: US 6,174,618 B1
(45) Date of Patent: Jan. 16, 2001

(54) BATTERY HOLDER

(75) Inventors: Koichi Nishiyama; Yoshinori Tanaka; Takehito Matsubara, all of Kyoto (JP)

(73) Assignee: Japan Storage Battery Co., Ltd., Kyoto (JP)

(*) Notice: Under 35 U.S.C. 154(b), the term of this patent shall be extended for 0 days.

(21) Appl. No.: 09/163,003

(22) Filed: Sep. 30, 1998

(30) Foreign Application Priority Data

Sep. 30, 1997 (JP) .................................................. 9-265237

(51) Int. Cl.$^7$ ...................................................... H02M 2/10
(52) U.S. Cl. ............................ 429/99; 429/100; 429/159
(58) Field of Search ................................ 429/96, 99, 100, 429/123, 156, 158–160

(56) References Cited

U.S. PATENT DOCUMENTS

| | | | |
|---|---|---|---|
| 5,096,788 | * | 3/1992 | Bresin et al. .......................... 429/99 |
| 5,578,392 | * | 11/1996 | Kawamura ............................. 429/99 |
| 5,763,116 | * | 6/1998 | Lapinski et al. ....................... 429/99 |

* cited by examiner

*Primary Examiner*—Maria Nuzzolillo
*Assistant Examiner*—Jonathan Crepeau
(74) *Attorney, Agent, or Firm*—Jacobson, Price, Holman & Stern, PLLC (57) ABSTRACT

The invention provides a battery holder consisting of one plate-like support member and another support member. A plurality of battery holes of a predetermined depth into which sealed portions of a positive or negative side of sealed-type batteries that are clamped at one side by the support member are to be respectively fitted are formed in one face of the support member, so that one row of the battery holes is a row for positive terminals and another row of the battery holes is a row for negative terminals. A terminal hole is formed in a bottom face of each of the battery holes. A groove is formed between adjacent paired positive-terminal and negative-terminal holes among the terminal holes disposed in the bottom faces of the battery holes of the rows. The paired positive-terminal and negative-terminal holes are communicated with each other through the groove. Vent holes are opened at appropriate places among the battery holes. In each of the one and other rows of the other support member, only the battery hole for a positive terminal or a negative terminal is formed at each of opposite end portions.

7 Claims, 8 Drawing Sheets

BATTERY HOLDER

BACKGROUND OF THE INVENTION

The invention relates to a battery holder which holds a plurality of sealed-type batteries in a bundle.

A prior art battery holder has a structure such as that shown in Japanese Utility Model Publication (Kokai) No. SH060-22752. In the battery holder, a plurality of cylindrical batteries are arranged in such a manner that their peripheral side faces are adjacent to each other, a frame surrounds the periphery of the arranged batteries, and a cover is attached to each of the end faces of the cylindrical batteries through which the positive and negative terminals of the cylindrical batteries are exposed. The frame consists of a side wall surrounding the periphery of the batteries, and a number of partition walls which are inwardly projected from the side wall. The cylindrical batteries are supported by inserting them into the spaces between the side wall and the partition walls, respectively. In some cases, a plurality of holes are formed in a block-like frame and cylindrical batteries are respectively fitted into the holes, or alternatively a large hole having a shape which is obtained by coupling such holes to each other is formed and a plurality of cylindrical batteries are fitted in a bundle into the hole. In the covers, elastic connecting plates are adequately disposed on the faces respectively opposing the end faces of the cylindrical batteries in the frame, so that the cylindrical batteries are electrically connected to each other.

In Japanese Utility Model Publication (Kokai) No. HEI2-99561, proposed is a battery box in which a plurality of battery housing portions are formed by a case outer wall and a case partition wall so as to respectively house a plurality of batteries as one unit. In each of the battery housing portions, a stay is inserted into a center portion of the unit of the plural housed batteries, so that the plural batteries are fixed with being closely contacted with the partition wall.

When a battery is discharged, heat is generated as a result of an internal chemical reaction. In the case of a heavy current drain, particularly, the amount of generated heat is increased. In a sealed-type secondary battery such as a nickel cadmium battery or a nickel-metal hydride battery, the heat generation occurs also when the battery is charged. When the temperature of the battery is raised as a result of the heat generation, self-discharge may reduce the battery capacity or shorten the service life of the battery. Therefore, it is previously determined that such a battery is used in a temperature range of −10 to 60° C. during a discharging process and 0 to 35° C. during a charging process.

In the prior art battery holder, however, each cylindrical battery is surrounded by the frame and both the ends are covered by the covers so that the interior of the holder is substantially hermetically sealed, and hence heat generated from the cylindrical batteries during the discharging or charging process cannot be sufficiently dissipated to the exterior. This produces a problem in that the temperature of the cylindrical batteries may be raised to a level higher than the specified range. In the case where battery packs are to be used, when the battery packs are longitudinally held by a battery holder, a large space is required. In some cases, in order to eliminate this problem, batteries are held by a battery holder so as to constitute a battery pack, and the battery pack is used with being laterally arranged with a number of similar battery packs. When battery packs are to be connected to each other, the connection must be surely conducted so that connecting portions where a terminal is connected to another terminal are not short-circuited. When battery packs are to be connected to each other, furthermore, the connection is requested so to be unaffected by vibration or shock as much as possible. These problems are also applicable to sealed-type batteries of other types such as those of rectangular batteries.

SUMMARY OF THE INVENTION

The invention has been conducted in order solve the above-discussed problems. It is an object of the invention to provide a battery holder which allows a number of battery holders to be arranged under a state where both the ends of batteries are supported by the support members and the support members are laterally arranged, which allows a number of battery packs to be connected to each other while a short-circuit is surely prevented from occurring, which is advantageous in view of a space, and in which heat generated from sealed-type batteries can be rapidly dissipated to the exterior.

In order to solve the problems, the battery holder of the invention is characterized in that it has configuration ① in which the battery holder comprises a plate-like support member (2') wherein a plurality of battery holes (2a) of a predetermined depth into which sealed portions of a positive or negative side of sealed-type batteries that are clamped at one side by the support member are to be respectively fitted are formed in one face of the support member (2'), one row of the battery holes being a row for positive terminals, another row of the battery holes being a row for negative terminals, an terminal hole (2b) is formed in a bottom face of each of the battery holes (2a), a groove (2c) is formed between adjacent paired positive-terminal and negative-terminal holes among the terminal holes (2b) disposed in the bottom faces of the terminal holes of the rows, the paired positive-terminal and negative-terminal holes (2b) being communicated with each other through the groove, and vent holes (2d) which pass through from one face to another face are opened at appropriate places among the battery holes of the support member (2').

The battery holder of the invention is characterized in that it has configuration ② in which the battery holder comprises a support member (2) wherein a plurality of battery holes (2a) of a predetermined depth which are formed in one side face of the support member so that one row of the battery holes is a row for positive terminals of sealed-type batteries and another row of the battery holes is a row for negative terminals, and, in each of the one and other rows, only a battery hole (2a) for a positive terminal or a negative terminal is formed at each of opposite end portions.

The battery holder of the invention is characterized in that it has configuration ③ in which the battery holder comprises a pair of plate-like support members which support one and another sides of batteries, respectively, one of the support members is the support member (2') of the configuration ①, and the other support member is the support member (2) of the configuration ②.

The battery holder of the invention is characterized in that it has configuration ④ in which, among the terminal holes (2b) disposed in the bottom faces of the terminal holes (2a) of the rows, the paired positive-terminal (2b) and negative-terminal holes (2b) which are communicated with each other through the groove (2c) are inclinedly disposed.

The battery holder of the invention is characterized in that it has configuration ⑤ in which a recess groove (2e) is formed at an appropriate place of a side face of the plate-like support member (2, 2').

The battery holder of the invention is characterized in that it has configuration ⑥ in which terminals (1a, 1b) of different heights are disposed on the positive and negative sides, and the battery holes (2a, 2a) which are adjacent to each other are respectively formed at depths having a height difference which is equal to a height difference of the terminals of different polarities.

DETAILED DESCRIPTION OF THE PREFERRED EMBODIMENTS

Hereinafter, embodiments of the invention will be described with reference to the accompanying drawings.

Figure 1:
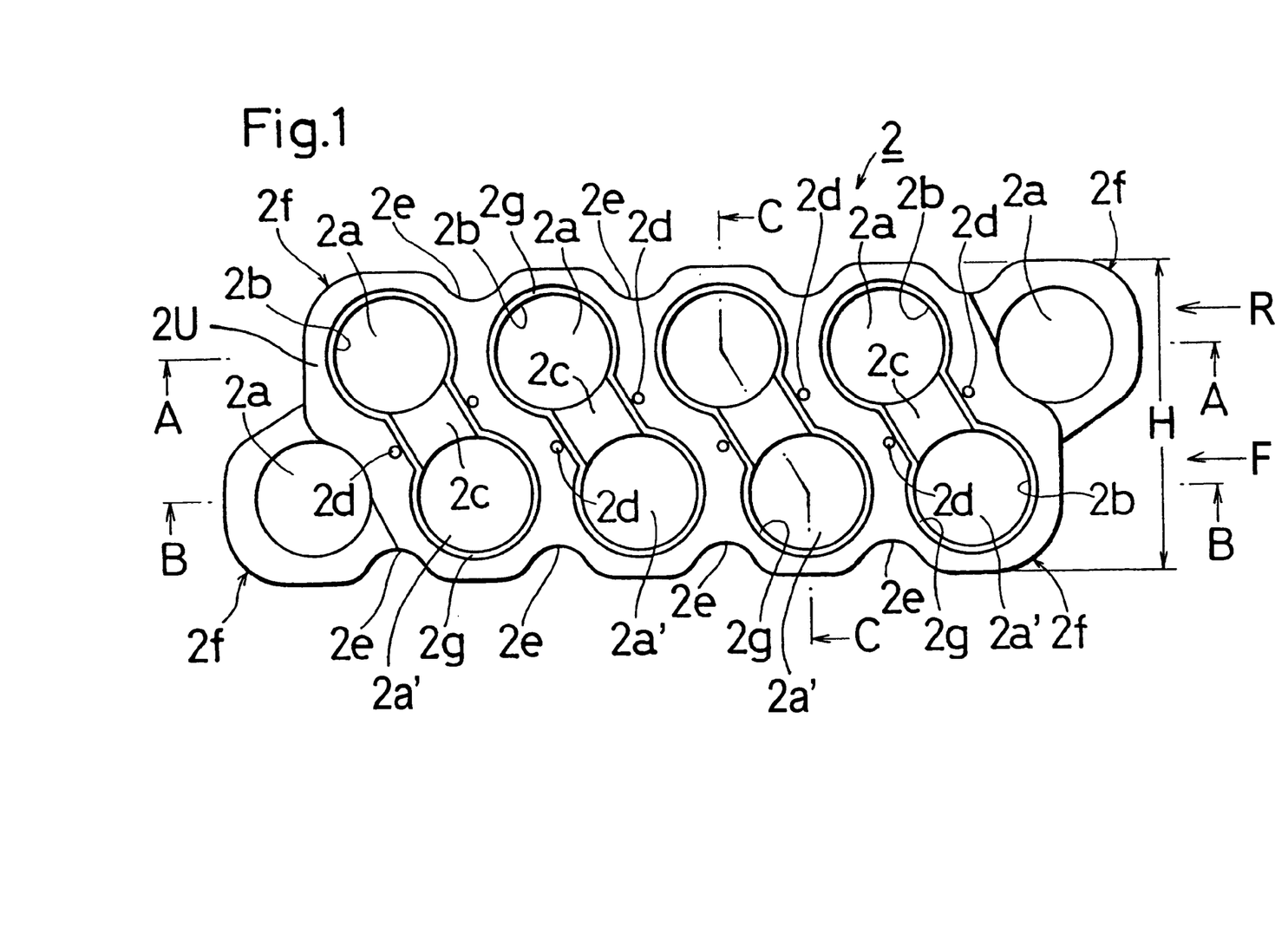
FIG. 1 is a plan view of a first, or upper, support member comprising a main component of the battery holder of the invention.
Figure 2:
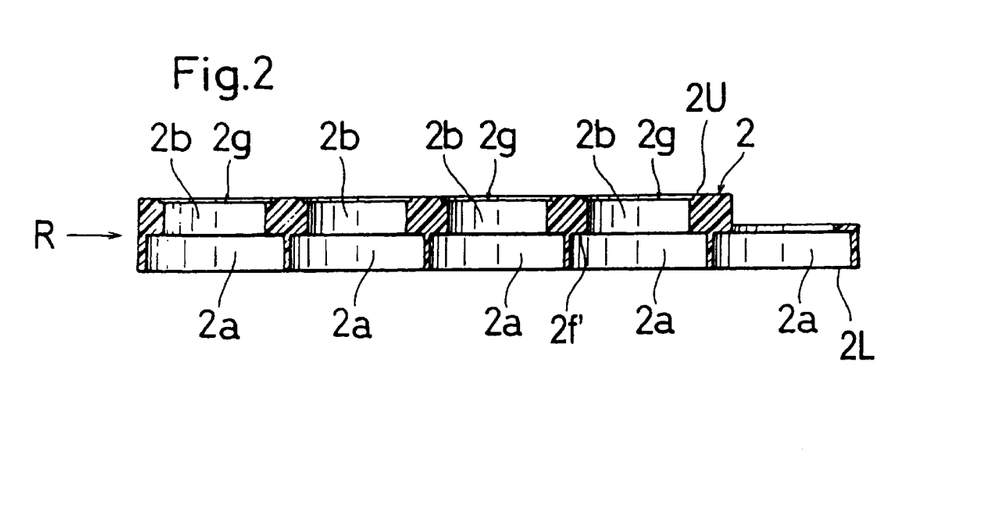
FIG. 2 is a section view taken along the line A—A of FIG. 1.
Figure 3:
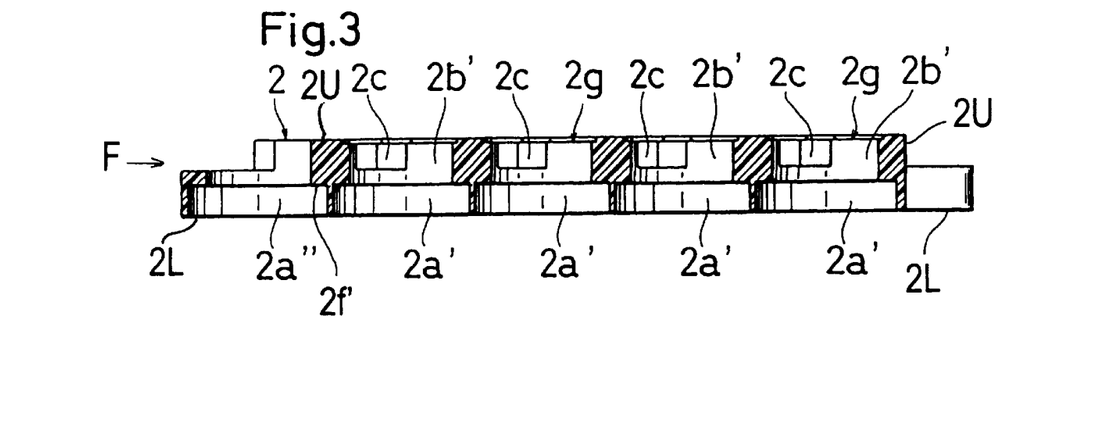
FIG. 3 is a section view taken along the line B—B of FIG. 1.
Figure 4:
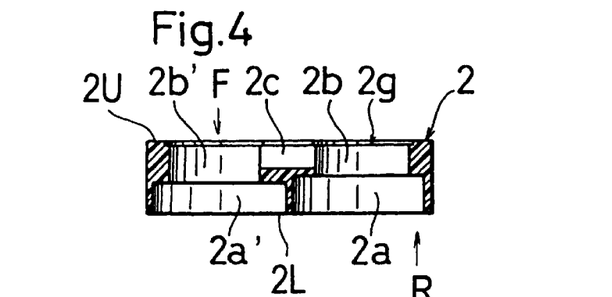
FIG. 4 is a section view taken along the line C—C of FIG. 1.

FIG. 1 is a plan view of the battery holder of the invention, FIG. 2 is a section view taken along the line A—A of FIG. 1, FIG. 3 is a section view taken along the line B—B of FIG. 1, and FIG. 4 is a section view taken along the line C—C of FIG. 1.

The battery holder consists of a support member 2 which, for example, holds one side of sealed-type batteries, and is produced by injection molding a synthetic resin (for example, an ABS resin) which is flame resistant and electrically insulative. When batteries are to be held, one side of each battery is held by the support member 2, and the other side is held by a support member 2' having a structure which is obtained by slightly modifying that of the support member 2 as described later.

Figure 5A:
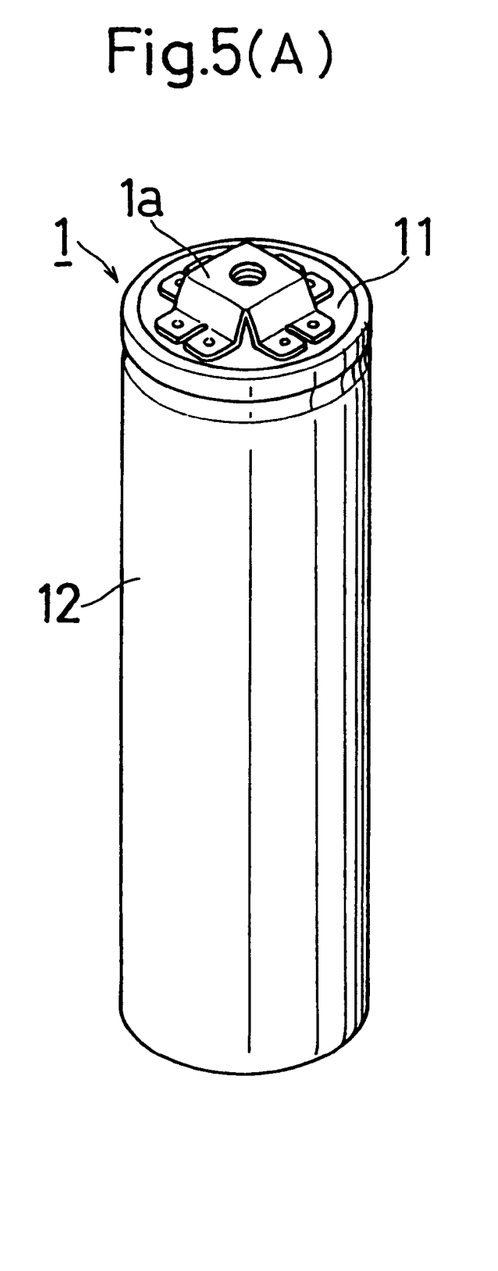
FIG. 5(A) is a perspective view of a sealed-type battery which is to be held by the battery holder of the invention, and as seen from the positive end.
Figure 5B:
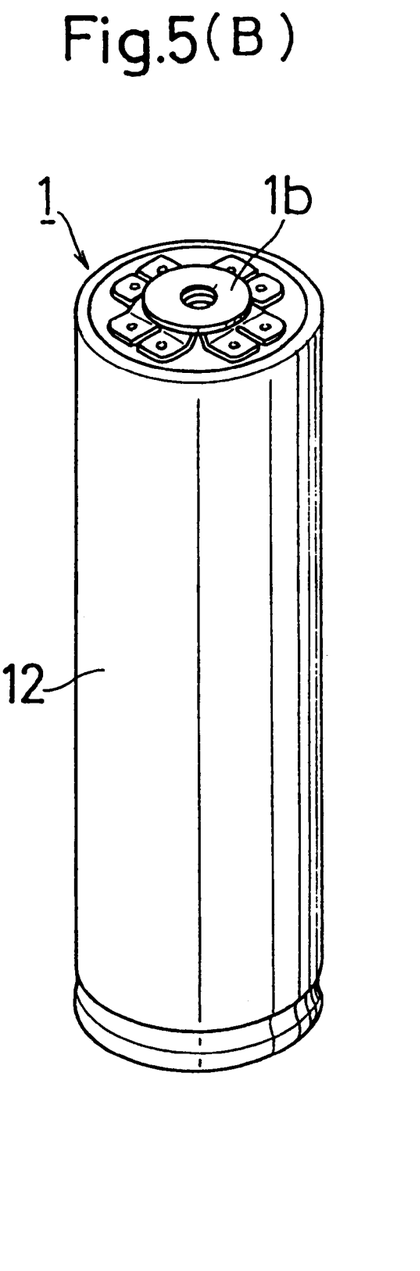
FIG. 5(B) is a perspective view of the battery as seen from the negative end.

FIG. 5(A) is a perspective view of a sealed-type battery which is to be held by the battery holder of the invention, and as seen from the positive side, and FIG. 5(B) is a perspective view of the battery as seen from the negative side. As the battery, a sealed-type secondary battery such as a nickel cadmium battery or a nickel-metal hydride battery is used. However, the kind of the battery is not restricted to the above. In the cylindrical battery 1, a tall terminal 1a is attached to a cover 11 on the positive side, and a low terminal 11b is attached to the lower face of a case 12 on the negative side.

In the support member 2, as shown in FIGS. 1 to 4, battery holes 2a having a diameter which is equal to or slightly larger than the diameter of the cylindrical portion of the cylindrical battery 1 are formed in one side face and in two rows each of which consists of five holes (the number of holes is not limited.

The first support member 2 as shown in FIGS. 1 through 4 has an upper face 2U and a lower face 2L and a plurality of openings or holes each formed of a smaller diameter upper terminal receiving hole 2b and/or a larger diameter lower battery case receiving hole 2a that extend vertically through the first upper support 2 and are arranged in a rear row R and a front row F extending from left to right as shown in FIG. 1.

In rear row R, each of the four adjacent circular holes beginning with the opening on the left end of row R of FIG. 1 consists of an upper smaller diameter terminal receiving hole 2b which extends downwardly from upper face 2U and a lower large diameter battery case receiving hole 2a which is coaxial with the upper small diameter terminal receiving holes 2b and has a lower termination at lower face 2L. The lower large diameter battery case holes 2a have a diameter that is equal to or slightly larger than the diameter of the cylindrical portion of battery case 12 of cylindrical battery 1 as shown in FIG. 5.

It should be observed that the opening on the right end rear row R consists solely of a lower large diameter battery case receiving hole 2a and the vertical height dimensions of the lower large diameter battery body receiving holes 2a and the upper small diameter terminal receiving holes 2b are approximately the same in rear row R as shown in FIG. 2 of the drawings.

In front row F, the circular holes differ from the holes of rear row R in two main respects as best shown in FIG. 3. Firstly, the four holes forming the right end of front row F each include both taller upper small diameter terminal receiving holes 2b' and lower large diameter battery case receiving holes 2a'. Terminal receiving holes 2b' are of greater vertical dimension (height) than are the shorter lower large diameter battery case receiving holes 2a'. Additionally, the circular opening on the left end of front row F consists solely of a shorter large diameter battery case receiving hole 2a" which is not associated with a small diameter terminal hole in the manner of the four right hand holes 2a'in the front row F. Thus, it should be noted that hole 2a" at the left end of front row F of the first support member 2 and the hole 2a at the right end of the rear row R are formed so as to project outwardly beyond the upper terminal receiving holes 2b and 2b' of their respective rows.

It is also significant that the rear row R of holes is not aligned transversely with corresponding holes in the front row F in that the holes in the rear row are shifted to the right relative to the holes in the front row F as shown in FIG. 1. Thus, adjacent holes of the two rows are inclined relative to each other. The foregoing position of the rows of holes permits the first support member 2 to have a transverse dimension H of a smaller value than would be the case if the holes were aligned in front to rear orientation.

The height dimension of the upper shorter small diameter terminal receiving holes 2b in rear row R is sufficient to accommodate the height dimension of the short negative terminal 1b of the battery. Similarly, in front row F the height dimension of the upper taller terminal receiving holes 2b' is sufficient to permit positioning and enclosure of the taller positive terminal 1a when the battery case 12 is inserted in the lower large diameter battery case receiving hole 2*a*' of the front row F. The foregoing relationship is possible because the taller holes 2*b*' have a height (axial dimension) which exceeds the height of the shorter lower large diameter holes 2*a*' by an amount equal to the difference in height between terminals 1*a* and 1*b* of the battery.

Each of the upper small diameter terminal receiving holes 2*b* of rear row R is configured so that when the positive end cylindrical portion of the cylindrical battery 1 is fitted into the corresponding round battery hole 2*a*, the negative terminal 1*a* enters the terminal hole 2*b* and the shoulder or upper end of the cylindrical casing 12 abuts against the upper face 2*f* of the battery receiving hole 2*a*. Similarly, the configuration of the upper taller small diameter terminal receiving holes 2*b*' is such that when the negative end of the battery is inserted in the aligned corresponding shorter lower large diameter battery case receiving hole 2*a*', the positive terminal 1*a* enters the hole 2*b*' and the shoulder or upper end of the negative terminal end of battery casing 12 abuts against the upper face 2*f* of the battery hole 2*a*' of the front row so as to accurately position the positive terminal in the terminal hole 2*b*' in the corresponding aligned terminal hole 2*b*'. The difference in depth of the holes 2*b*' and 2*a*' is such that the upper end surfaces of the tip ends of the terminals 1*a* and 1*b* are substantially horizontally flush with each other.

As described later, a plurality of battery packs in each of which the batteries 1 are held between the first support member 2 and a second or lower support member 2' are produced and these battery packs are connected to each other. In this case, the terminal 1*a* of one battery pack is connected to the terminal 1*b* of another battery pack by a connecting plate 3 in such a manner that the connecting plate 3, the terminals 1*a* and 1*b*, and bolts 5 fixed (screwed) to the terminals 1*a* and 1*b* do not protrude to the outside of the first support member 2 or second support member 2'.

The second or lower support member 2' is similar to the first support member 2 in that it includes large diameter battery case receiving holes 2*a*'and smaller diameter terminal receiving holes 2*b*' ; however, the position of the battery case receiving holes 2*a* is reversed from the position of the same holes in the first support member in that the holes 2*a* of the second support member are provided extending downwardly from the upper surface 2'U as opposed to the first support member in which the larger diameter holes extend upwardly from the lower face 2L. Also, the terminal receiving holes 2*b* extend upwardly from the lower face 2'L of the second support member. Lastly, the lower support member 2'U does not have any single diameter holes corresponding to the opening at the right end of row R or the left hand opening 2*a* of row F of the first support member 2. Thus, all of the holes of the lower support member 2'U are identical to each other and consist of an upper battery case receiving larger diameter openings 2*a* and lower terminal receiving openings 2*b*.

A groove 2*c* is formed between each of pairs of adjacent terminal receiving holes 2*b* and 2*b*' on the positive and negative sides and in the one and other rows of the terminal holes formed in the support member 2. These terminal holes are communicated with each other through the groove. The groove 2*c* is formed so as to be inclined in accordance with the terminal holes 2*b* which are formed in the bottoms of the battery holes 2*a* that are inclinedly disposed. The grooves 2*c* are used for placing the connecting plates 3 which are respectively connected between the terminals 1*a* and 1*b* of the batteries 1 (see FIGS. 7 to 10). Each connecting plate 3 is bridged between paired terminals 1*a* and 1*b*, and fixed to the terminals by screwing of nuts 6 and bolts 5. The grooves 2*c* inhibit the connecting plates 3 from being rotated from their illustrated position when one side of one of the connecting plates 3 is disconnected, thereby preventing a short circuit from occurring. The grooves 2*c* have a depth at which, when the connecting plates 3 are attached, no part of each connecting plate 3 protects from the surface of the first support member 2.

In the first and second support members 2 and 2', vent holes 2*d* which pass through from one face to another face are opened at appropriate places in a thick portion surrounded by the battery holes 2*a*, etc. A plurality of vertical recess grooves 2*e* are provided in the front and rear faces of suppports 2 and 2' for effecting the flow of air and the resulting cooling of the batteries 1. The four corners of each of the first second rectangular support members 2 and 2' are ground into an arcuate convex shape, thereby forming rounded portions 2*f*.

Figure 6:
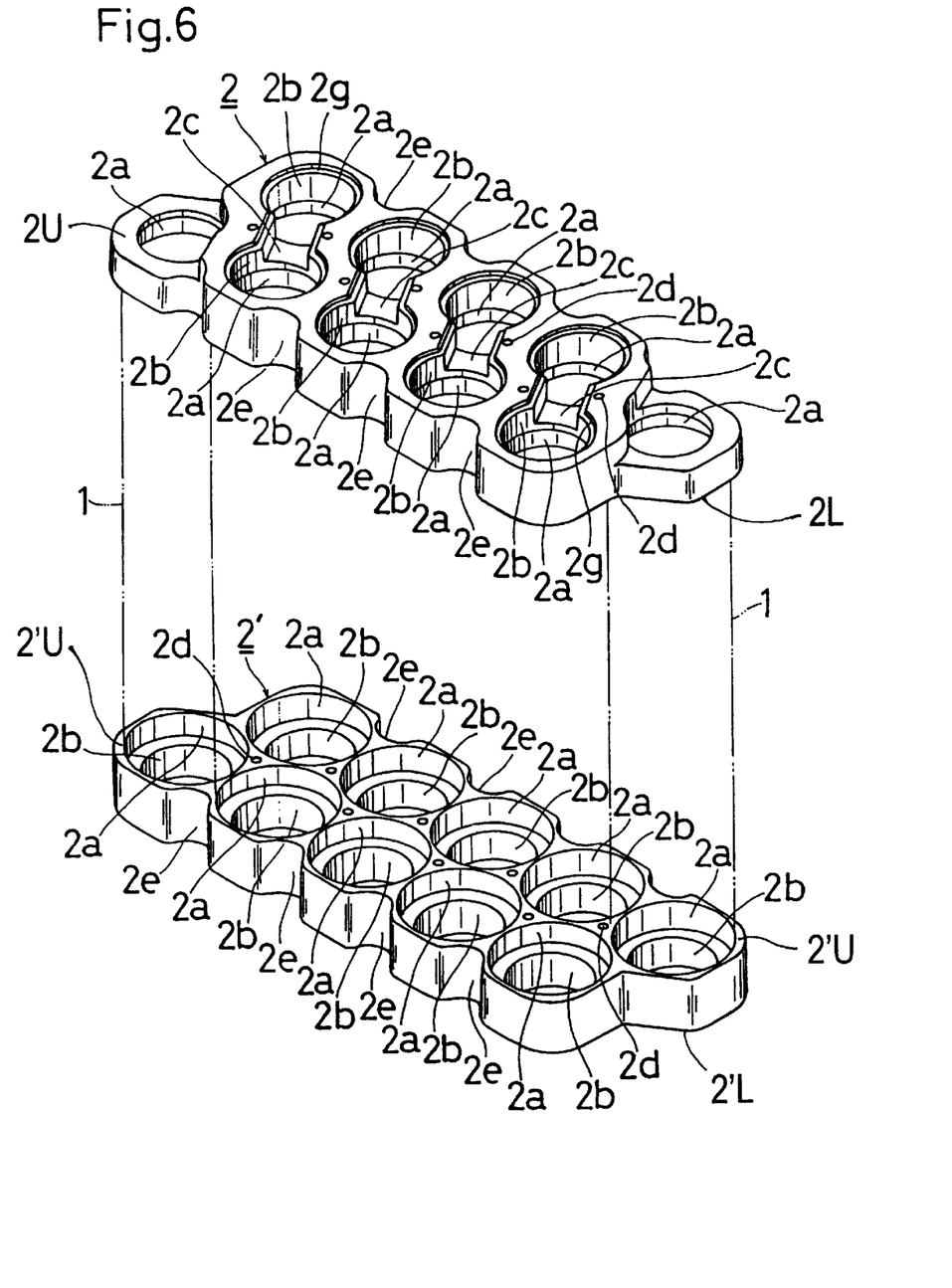
FIG. 6 is a perspective view showing a state in which sealed-type batteries are held by the first, or upper, support member and a second, or lower support member which together comprise the battery holder of the invention.

FIG. 6 is a perspective view showing a state in which the batteries 1 are held by the first and second support members 2 and 2'. The first and second support members 2 and 2' are placed in a direction in which their faces wherein the battery holes 2*a* are formed are opposed to each other and the opposing battery holes 2*a* have different depths. Therefore, the cylindrical portions of the positive and negative sides of ten cylindrical batteries 1 are fitted into the battery holes 2*a* of the first and second support members 2 and 2', respectively.

Figure 7:
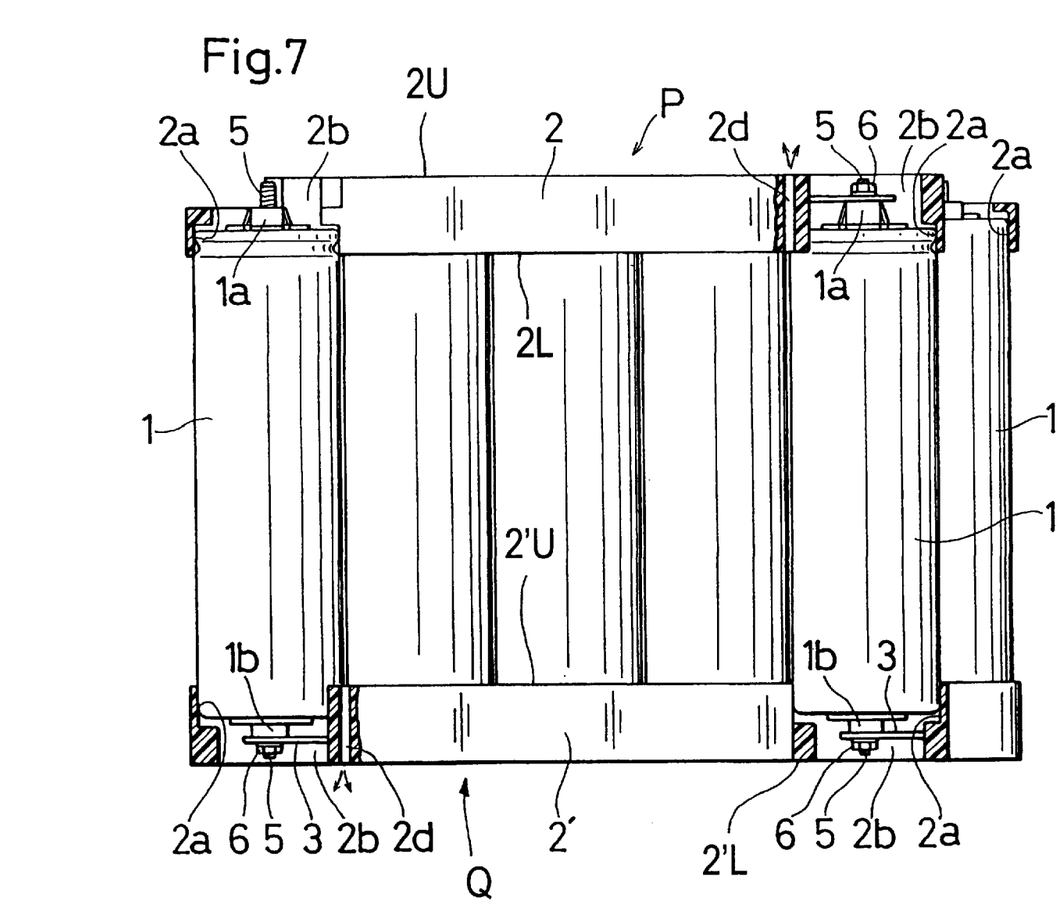
FIG. 7 is a front view showing a state in which batteries are held between the first and second support comprising the battery holder of the invention.
Figure 8:
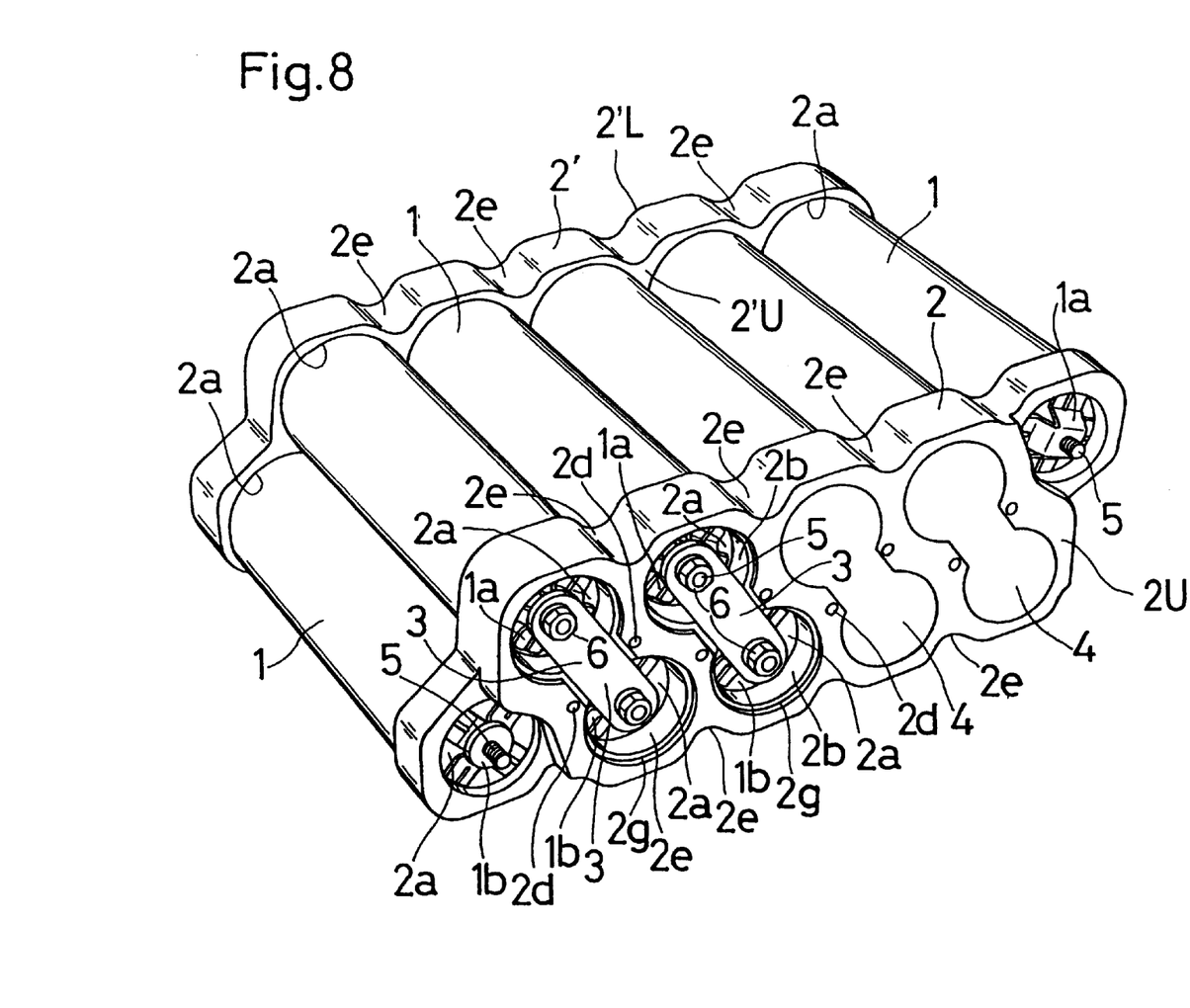
FIG. 8 is a perspective view as seen in the direction of the arrow P in FIG. 7.
Figure 9:
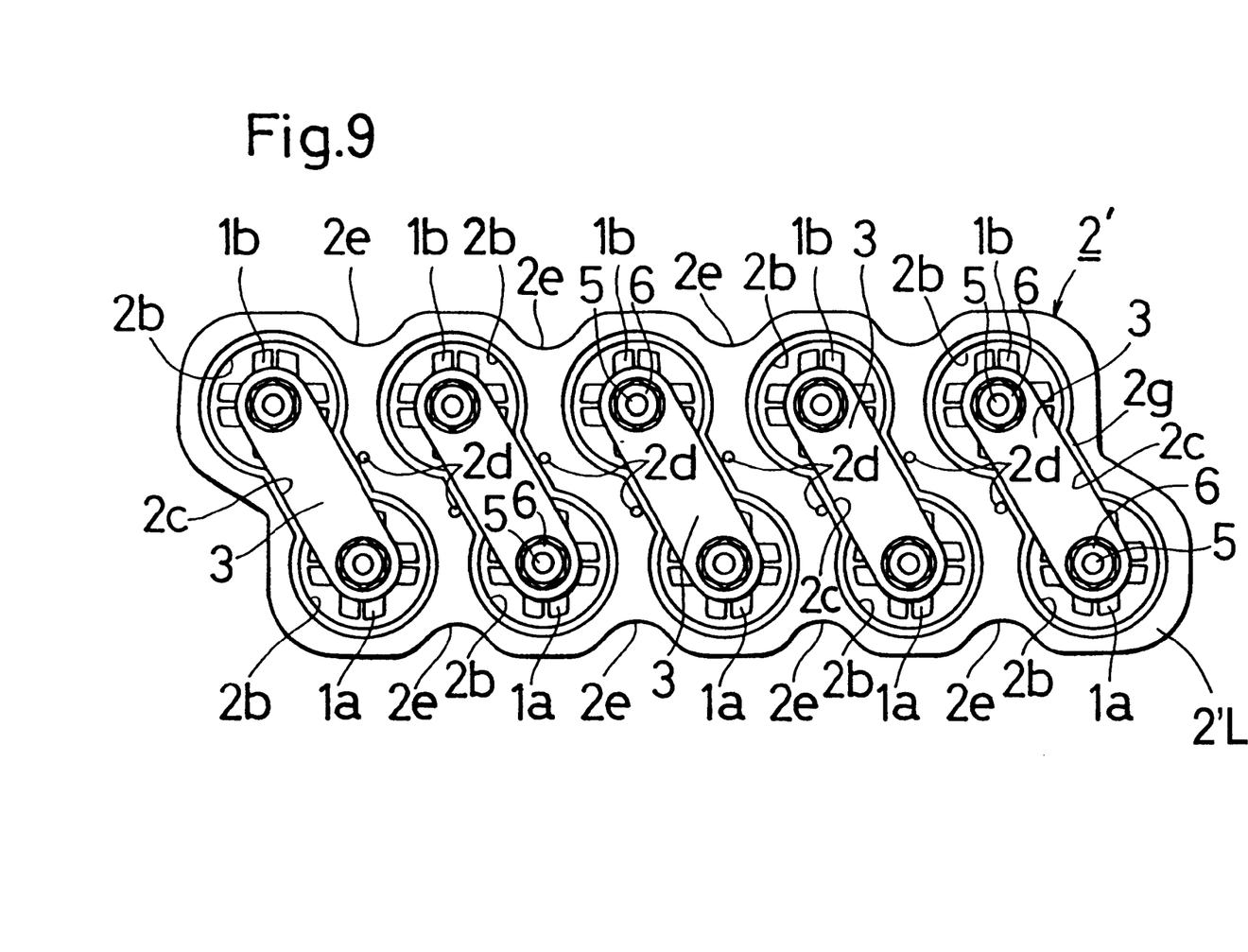
FIG. 9 is a bottom view as seen in the direction of the arrow Q in FIG. 7.

FIG. 7 is a front view showing a state in which the ten cylindrical batteries 1 are held between the first and second support members 2 and 2', FIG. 8 is a perspective view as seen in the direction of the arrow P in FIG. 7, and FIG. 9 is a bottom view as seen in the direction of the arrow Q in FIG. 7.

As shown in the figures, the ten cylindrical batteries 1 are pressingly held between the first and second support members 2 and 2', and the terminals 1*a* and 1*b* of the cylindrical batteries 1 are sequentially connected to each other by the connecting plates 3 bridged in the grooves 2*c* through which the paired terminal holes 2*b* and 2*b*' are communicated with each other. In the upper 2U of the first support member 2, flat plate-like connecting plates 3 made of a conductor are bridged between the terminals 1*a* and 1*b* which are adjacent to each other in the row direction, and screwed by the bolts 5 and the nuts 6. In the lower face 22 and similar connecting plates 3 are bridged between the terminals 1*a* and 1*b* which are adjacent to each other across the rows, and held in place on the bolts 5 by the nuts 6 screwed onto the bolts 5. As a result, as shown in FIG. 9, all the ten the cylindrical batteries 1 are connected in series between the terminals 1*a* and 1*b* on the positive and negative sides which are exposed respectively at two end places of the upper support member 2 to which the connecting plates 3 are not attached. The screwing of the connecting plates 3 by means of the bolts 5 and the nuts 6 is performed by passing male-thread portions of the bolts 5 through holes opened in the ends of the connecting plates 3 and then screwing the male-thread portions into female-thread holes of the connecting faces of the terminals 1*a* and 1*b*. In this case, as shown in FIG. 7, the connecting faces of the terminals 1*a* and 1*b* are substantially flush with the upper face 2U of the first support member 2, and hence the flat plate-like connecting plates 3 can held in place on the bolts 5 in at parallel positions which are substantially contacted with the upper face 2U of the first support member 2. The screw fixation of the connecting plates 3 enables the first and second support members 2 and 2' to be fixed integrally with the ten cylindrical batteries 1. In the first support member 2 (and also in the second support member 2'), as shown in FIGS. 1 to 4 and the like, a step 2g is formed in an edge of each of the terminal holes 2b and the grooves 2c. Covers 4 (see FIG. 8) are fitted into the steps 2g, respectively.

In the battery holder in which the ten cylindrical batteries 1 are held by the first and second support members 2 and 2' as described above, ventilation is enabled between the exterior and the vicinity of the inward-directed peripheral side faces of the cylindrical batteries 1, via the vent holes 2d of the first and second support members 2 and 2'. Consequently, heat generated from the cylindrical batteries 1 can be rapidly dissipated to the exterior. The outward-directed peripheral side faces of the cylindrical batteries 1 which are arranged in two rows are exposed as they are between the first and second support members 2 and 2', so that heat can be dissipated also from the faces. Accordingly, the heat dissipation of the cylindrical batteries 1 is accelerated by the vent holes 2d and the like, whereby the temperature rise of the cylindrical batteries 1 can be suppressed so as not to exceed the specified range. The ventilation due to the vent holes 2d and the like is conducted by natural convection. Particularly when the amount of generated heat is large, the ventilation may be forcedly conducted by using a fan or the like.

Figure 10:
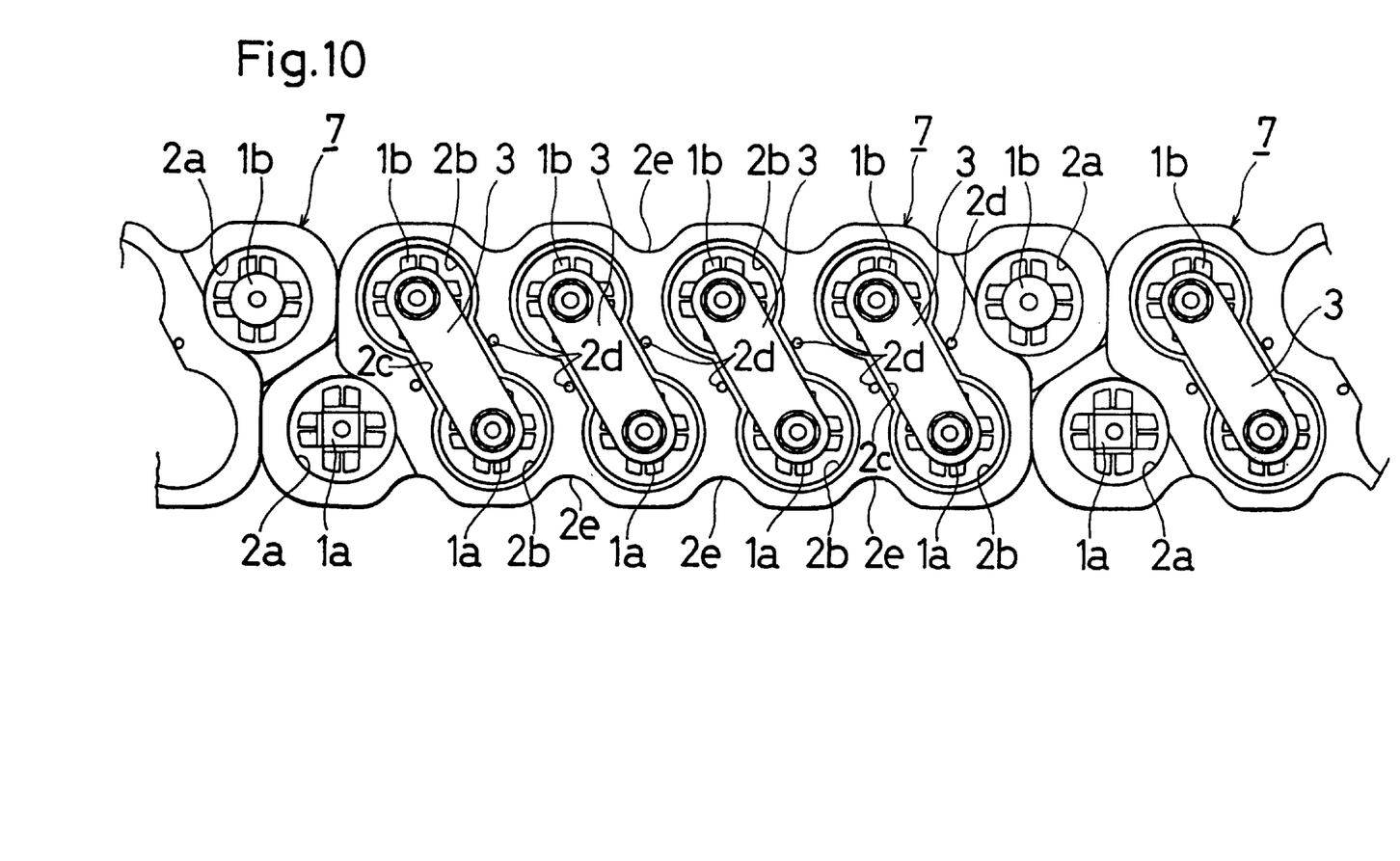
FIG. 10 is a plan view showing a state in which a plurality of battery packs each of which is held by two support members constituting the battery holder of the invention are horizontally arranged and connected.

As shown in FIG. 10, a plurality of battery packs 7 in each of which ten cylindrical batteries 1 are held by the battery holder consisting of the first and second support members 2 and 2' may be laterally connected to each other. When the battery packs 7 in which the batteries 1 are held between the first and second support members 2 and 2' are laterally closely arranged, namely, the battery packs are located at positions where the terminal 1a at first end portion of the one support member 2 of a certain battery pack 7 can be just connected to the other terminal 1b of another battery pack 7 by the connecting plate 3. When a plurality of battery packs are connected to each other by the connecting plates 3 in this way, a number of batteries 1 are connected in series.

In the embodiment of the invention, the battery holder in which ten cylindrical batteries 1 are held has been described. The number of the cylindrical batteries 1 can be set arbitrarily. The battery holes 2a and the like in first and second members 2 and 2' are adequately formed in accordance with the number of the cylindrical batteries 1 and the manner of arrangement.

Under a state in which unit batteries are connected to each other, the conductor portions such as the connecting plates 3 and the bolts 5 are exposed. In the first support member 2 (and also in the second support member 2' ), however, the steps 2g are formed in the edges of the terminal holes 2b and the grooves 2c, and the covers 4 are respectively fitted into the steps 2g, whereby risks such as that the batteries are erroneously short-circuited can be prevented from occurring.

As described above in detail, according to the battery holder of the invention, a number of batteries can be held by a support member, and the support member is laterally disposed, whereby the batteries can be disposed as, for example, batteries for an electric vehicle without requiring a large space on the floor. When battery packs each holding a plurality of batteries are configured, a number of battery packs can be laterally arranged.

In the invention, heat generated from the cylindrical batteries can be dissipated to the exterior via the vent holes of the support members and the exposed side faces between the upper and lower support members, and hence the temperature rise of the cylindrical batteries can be suppressed as a result of performing natural convection or forced ventilation. When the battery holder in which cylindrical batteries are held by a pair of support members is horizontally laid on the floor, heat can be dissipated to the exterior via the recess grooves between the support members and the floor. Even when a number of cylindrical batteries are densely arranged, therefore, the temperature rise can be surely suppressed.

What is claimed is:

1. A battery holder for retaining a plurality of sealed batteries each having a case having a negative end and a positive end and negative and positive terminals respectively provided on said negative and positive ends of said case, said holder comprising a support member having upper and lower faces in which a plurality of battery case receiving holes of a predetermined depth are formed for receiving and retaining a positive or negative end of a battery case wherein said battery case receiving holes are formed in first and second rows in one face of said support member, one row of said battery case receiving holes being a row for receiving positive ends of battery cases and another row of said battery case receiving holes being a row for receiving negative ends of said battery cases, terminal receiving holes each respectively formed in axial alignment and communication with one of said battery case receiving holes so that said terminal receiving holes comprise a row of positive terminal receiving holes adjacent a row of negative terminal receiving holes with each positive terminal receiving hole being paired with an adjacent negative terminal receiving hole, a groove formed in said support member between adjacent paired positive and negative terminal receiving holes disposed in said support member, said paired positive terminal receiving holes and negative terminal receiving holes being communicated with each other through said groove, and vent holes extending from one face to the other face of said support member for permitting cooling by airflow through said support member.

2. A battery holder according to claim 1, wherein said battery case receiving holes of said first row are of a predetermined depth and are formed in one face of said support to receive the negative end of said case and said second row of battery case receiving holes is of a second predetermined depth to receive a positive end of said case.

3. A battery holder wherein said battery holder comprises a pair of plate-like support members which support one and another sides of batteries, respectively, and wherein one of said support members is the support member set forth in claim 1.

4. A battery holder according to claim 1, wherein said paired terminal receiving receiving holes which are communicated with each other through said groove are inclinedly disposed.

5. A battery holder according to claim 1, wherein a plurality of recess grooves are formed in a side face of said support member.

6. A battery holder according to claim 1, wherein positive and negative terminals of different heights are disposed on said positive and negative ends of said battery case and said first row of terminal receiving holes and said second row of terminal receiving holes have a difference in depth which is equal to a height difference of said positive and negative terminals.

7. A battery holder wherein said battery holder comprises a pair of plate-like support members which support one and another sides of batteries, repectively, and wherein one of said support members is the support member as set forth in claim 2.

* * * * *